(12) United States Patent
Zhang et al.

(10) Patent No.: US 12,234,661 B1
(45) Date of Patent: Feb. 25, 2025

(54) AUTOMATIC LEVELING CARBON FIBER REINFORCED POLYMER (CFRP) PLATE PRE-STRESSING AND TENSIONING DEVICES FOR CURVED SURFACE STRUCTURES

(71) Applicant: FUJIAN UNIVERSITY OF TECHNOLOGY, Fujian (CN)

(72) Inventors: Wei Zhang, Fuzhou (CN); Bofeng Liu, Fuzhou (CN); Yiqun Huang, Fuzhou (CN); Benqing Lin, Fuzhou (CN)

(73) Assignee: FUJIAN UNIVERSITY OF TECHNOLOGY, Fuzhou (CN)

( * ) Notice: Subject to any disclaimer, the term of this patent is extended or adjusted under 35 U.S.C. 154(b) by 0 days.

(21) Appl. No.: 18/777,853

(22) Filed: Jul. 19, 2024

(30) Foreign Application Priority Data

Dec. 26, 2023 (CN) .......................... 202311802334.6

(51) Int. Cl.
*E04G 23/02* (2006.01)
*E04C 5/12* (2006.01)
(Continued)

(52) U.S. Cl.
CPC .......... *E04G 23/0218* (2013.01); *E04C 5/127* (2013.01); *E04G 21/121* (2013.01);
(Continued)

(58) Field of Classification Search
CPC .............. E04G 21/121; E04G 23/0218; E04G 2023/0251; E04G 2023/0255; E04G 2023/0259; E04G 2023/0262; E04C 5/127
See application file for complete search history.

(56) References Cited

U.S. PATENT DOCUMENTS

| | | | |
|---|---|---|---|
| 7,441,380 B2* | 10/2008 | Andra | E04C 5/127 52/223.13 |
| 10,689,870 B2* | 6/2020 | Wu | E04G 21/12 |
| 11,186,991 B2* | 11/2021 | Xing | E04G 21/12 |

(Continued)

FOREIGN PATENT DOCUMENTS

| CN | 101265750 A | 9/2008 |
|---|---|---|
| CN | 105332513 A | 2/2016 |

(Continued)

OTHER PUBLICATIONS

First Office Action in Chinese Application No. 202311802334.6 mailed on Jan. 31, 2024, 14 pages.

(Continued)

*Primary Examiner* — Jessie T Fonseca
(74) *Attorney, Agent, or Firm* — Porus IP LLC

(57) ABSTRACT

Disclosed is an automatic leveling CFRP plate pre-stressing and tensioning device for a curved surface structure, including a fixed end mechanism and a tension end mechanism, one end of the CFRP plate is connected to the fixed end mechanism and the other end is connected to the tension end mechanism, and the fixed end mechanism cooperating with the tension end mechanism to reinforce a curved surface. The fixed end mechanism includes a fixed end base plate, a fixture, a fixed end CFRP plate clamping plate, and a second high-strength bolt. The fixed end base plate is provided with a slide groove, the fixture is hinged within the slide groove by the second high-strength bolt; the fixture is provided with a fixture groove, and a size of the fixture groove decreases from one end of the fixture near the tension end mechanism to the other end of the fixture.

1 Claim, 17 Drawing Sheets

(51) Int. Cl.
*E04G 21/12* (2006.01)
*E21D 11/40* (2006.01)

(52) U.S. Cl.
CPC ...... *E21D 11/40* (2013.01); *E04G 2023/0251* (2013.01); *E04G 2023/0255* (2013.01); *E04G 2023/0259* (2013.01); *E04G 2023/0262* (2013.01)

(56) References Cited

U.S. PATENT DOCUMENTS

2005/0247016 A1* 11/2005 Andra ............... E04C 5/127
52/745.21
2005/0252116 A1* 11/2005 Maier ............... E04C 5/085
52/223.1

FOREIGN PATENT DOCUMENTS

| | | | |
|---|---|---|---|
| CN | 105604331 A | | 5/2016 |
| CN | 205206350 U | | 5/2016 |
| CN | 105781123 A | * | 7/2016 |
| CN | 105952175 A | * | 9/2016 |
| CN | 106013835 A | | 10/2016 |
| CN | 106193643 A | | 12/2016 |
| CN | 207277886 U | | 4/2018 |
| CN | 108169020 A | | 6/2018 |
| CN | 110145072 A | * | 8/2019 |
| CN | 209624027 U | | 11/2019 |
| CN | 209907233 U | | 1/2020 |
| CN | 216947927 U | * | 7/2022 |
| DE | 10249266 B3 | | 4/2004 |
| GB | 821075 A | | 9/1959 |
| KR | 20080111664 A | * | 12/2008 |
| KR | 20100066697 A | * | 6/2010 |
| KR | 20240091522 A | * | 6/2024 |

OTHER PUBLICATIONS

Notification to Grant Patent Right for Invention in Chinese Application No. 202311802334.6 mailed on Feb. 21, 2024, 5 pages.

* cited by examiner

1

1

1

3

3

3

3

2

11

11

12

12

12

12

US 12,234,661 B1

AUTOMATIC LEVELING CARBON FIBER REINFORCED POLYMER (CFRP) PLATE PRE-STRESSING AND TENSIONING DEVICES FOR CURVED SURFACE STRUCTURES

CROSS-REFERENCE TO RELATED APPLICATIONS

This application claims priority to Chinese patent application No. 202311802334.6, filed Dec. 26, 2023, the entire contents of which are incorporated herein by reference.

TECHNICAL FIELD

The present disclosure relates to the field of civil engineering, and in particular, to an automatic leveling carbon fiber reinforced polymer (CFRP) plate prestressing and tensioning device for a curved surface structure.

BACKGROUND

With the continuous development of society, there are more and more methods and devices for restoring tunnel segment structures using pre-stressed carbon fiber reinforced polymer (CFRP) plate technology. The pre-stressed CFRP plate reinforcement technology, as an advanced method of reinforcing building structures, has been widely used in the reinforcement works of various building structures. This technology has become an industry standard due to its high efficiency and reliability. As the construction industry progresses and evolves, the demand and challenges of applying pre-stressed CFRP plates are also increasing, especially when dealing with non-traditional or complex forms of building structures.

Although the pre-stressed CFRP plate technology performs well in handling flat and straight-sided building structures such as girder undersurfaces and bridge undersurfaces, it faces a number of challenges in special application scenarios such as shield tunnel construction. For example, in shield tunneling construction, ellipticity overrunning is frequently encountered during tube segment installation due to operational errors or changes in the stratigraphic environment. The emergence of these problems highlights limitations of existing pre-stressed CFRP plate tensioning device in coping with curved or irregularly shaped structures. However, because conventional tensioning devices are designed primarily for planar structures, the prior art is limited in its effectiveness for reinforcing curved or curved structures.

Therefore, it is an urgent problem about how to provide an automatic leveling carbon fiber plate pre-stressing and tensioning device for curved surface structures.

SUMMARY

The present invention aims to provide an automatic leveling carbon fiber reinforced polymer (CFRP) plate prestressing and tensioning device for curved surface structures to solve the above technical problems. The device is provided with a fixture, which is capable of rotating in a slide groove in the bottom plate of the fixed end, and the rotatable fixture automatically levels the CFRP plate during tensioning by a hinged structure, which can avoid eccentricity of the CFRP plate caused by installation errors, etc., thus satisfying the pre-tensioning of the CFRP plate on the curved surface structure.

In order to achieve the above purpose, one of the embodiments of the present disclosure provides an automatic leveling carbon fiber reinforced polymer (CFRP) plate prestressing and tensioning device for a curved surface structure, comprising a fixed end mechanism and a tension end mechanism. One end of the CFRP plate is connected to the fixed end mechanism and the other end is connected to the tension end mechanism, and the fixed end mechanism is cooperated with the tension end mechanism to reinforce the curved surface. The fixed end mechanism includes a fixed end base plate, a fixture, a fixed end CFRP plate clamping plate, and a second high-strength bolt, the fixed end base plate is provided with a slide groove, and the fixed end base plate is provided with hinged holes throughout on both sides of the slide groove; the fixed end base plate has a plurality of bolt holes on both sides, the fixture is hinged within the slide groove by the second high-strength bolt; the fixture is provided with a fixture groove, and the fixture groove is connected to one end of the CFRP plate through the fixed end CFRP plate clamping plate.

In some embodiments, a size of the fixture groove decreases from one end of the fixture near the tension end mechanism to the other end of the fixture.

In some embodiments, the tension end mechanism includes a pushing and pulling mechanism, a tension end base plate, and a high-strength screw, the tension end base plate is provided with a tension groove, a tension hole is provided at an end of the tension end base plate close to the tension groove, the high-strength screw is provided in the tension hole, the tension hole is connected to the pushing and pulling mechanism by the high-strength screw, and a plurality of tension screw holes are provided on both sides of the tension end base plate.

In some embodiments, the pushing and pulling mechanism includes a pushing and pulling apparatus, a jack backing plate, an axial pressure sensor, a jack, a first high-strength bolt, a high-strength nut, and a tension end CFRP plate clamping plate, the pushing and pulling apparatus is provided with a connecting hole, the connecting hole is connected to one end of the high-strength screw away from the tension end base plate, and the pushing and pulling apparatus is also provided with a push-pull through hole; the push-pull through hole is connected to an end of the CFRP plate away from the fixed end mechanism through the tension end CFRP plate clamping plate, an end of the pushing and pulling apparatus away from the tension end base plate is connected to an end of the jack, an end of the jack away from the pushing and pulling apparatus is connected to an end of the axial pressure sensor, an end of the axial pressure sensor away from the jack is set on a side of the jack backing plate, the jack backing plate is provided with a plurality of plate screw holes, the first high-strength bolt is set in the plate screw holes, an end of the first high-strength bolt away from the jack backing plate goes through the tension screw holes along a vertical direction in the tension end base plate and is connected to the high-strength nut.

In some embodiments, a size of the push-pull through hole decreases from one end of the push-pull through hole near the tension end base plate to the other end of the push-pull through hole.

Some embodiments of the present disclosure include at least the following beneficial effects: the present invention is provided with a fixture, which is capable of rotating in a slide groove in the fixed end base plate, and the rotatable fixture can automatically level the CFRP plate by a hinged structure during tensioning, to avoid the eccentricity of the CFRP plate caused by the installation error, thus satisfying the pre-tensioning of the CFRP plate on curved surface structures. The CFRP plate is always horizontally loaded throughout the tensioning process of the present invention, and it is not limited to the influence of the form and size of curved structures, and the dimensions of the tensioning device may be changed according to the tensioning position of the structure. The present invention may effectively restore and strengthen the structural integrity of the tunnel tube segment by accurately controlling the tensioning process of the prestressed CFRP, while reducing stress concentration and avoiding tensioning failure.

BRIEF DESCRIPTION OF THE DRAWINGS

In order to more clearly illustrate the technical solutions in the embodiments of the present disclosure or prior art, the accompanying drawings that need to be used in the description of the embodiments or prior art will be briefly described below, and it is obvious that the accompanying drawings in the following description are only embodiments of the present disclosure, and that the person of ordinary skill in the art may obtain other drawings according to the provided drawings without creative labor.

DESCRIPTION OF MARKINGS IN THE ATTACHED DRAWINGS

Figure 1:
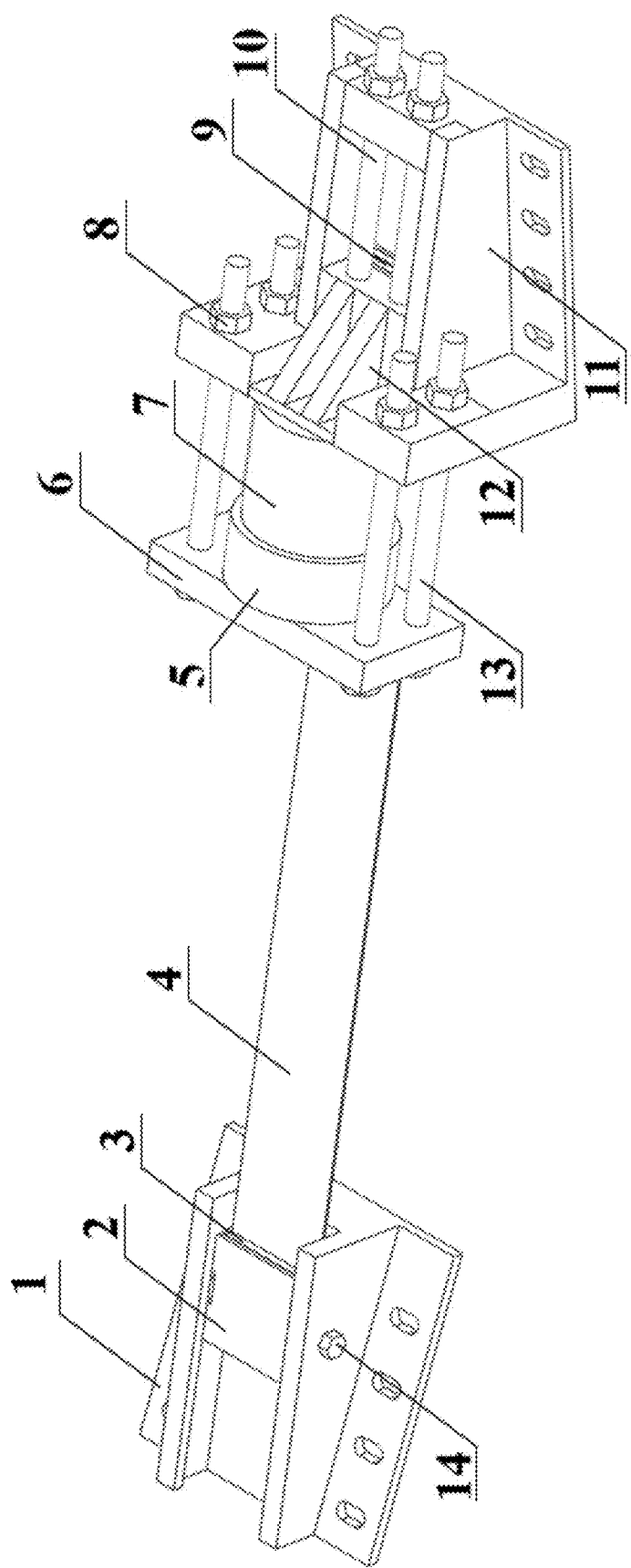
FIG. 1 is a schematic structural diagram of an automatic leveling carbon fiber reinforced polymer (CFRP) plate prestressing and tensioning device for a curved surface structure according to some embodiments of the present disclosure.

1—a fixed end base plate; 2—a fixture; 3—a fixed end CFRP plate clamping plate; 4—a CFRP plate; 5—an axial pressure sensor; 6—a jack backing plate; 7—a jack; 8—a high-strength nut; 9—a tension end CFRP plate clamping plate; 10—a high-strength screw; 11—a tension end base plate; 12—a pushing and pulling apparatus; 13—a first high-strength bolt; 14—a second high-strength bolt.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. The present disclosure may be applied to other similar scenarios based on these drawings without creative labor. Unless obviously obtained from the context or the context illustrates otherwise, the same numeral in the drawings refers to the same structure or operation.

It should be understood that as used herein, the terms "system", "device", "unit" and/or "module" as used herein is a way to distinguish between different components, elements, parts, sections or assemblies at different levels. However, the words may be replaced by other expressions if other words accomplish the same purpose.

Unless the context clearly suggests an exception, the words "a", "an", "one", and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

Figure 2:
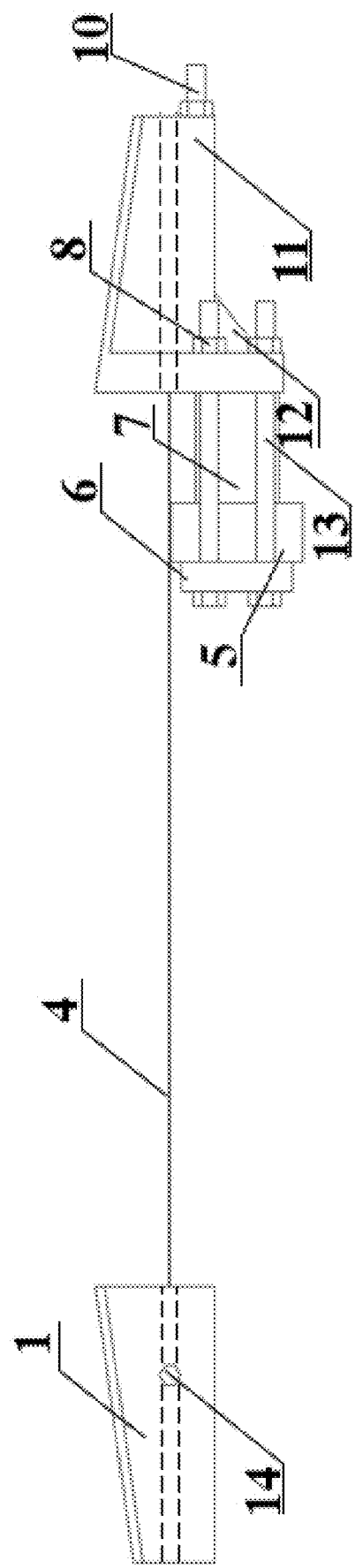
FIG. 2 is a schematic diagram of a front structure of an automatic leveling carbon fiber reinforced polymer (CFRP) plate prestressing and tensioning device for a curved surface structure according to some embodiments of the present disclosure.
Figure 3:
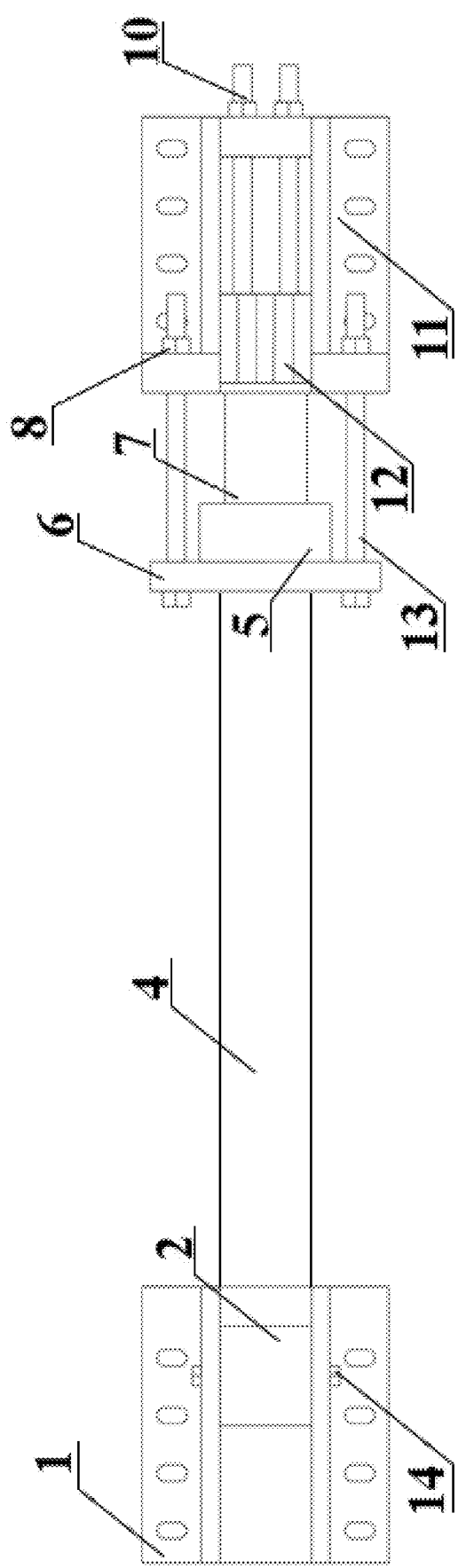
FIG. 3 is a schematic diagram of a top view structural of an automatic leveling carbon fiber reinforced polymer (CFRP) plate prestressing and tensioning device for a curved surface structure according to some embodiments of the present disclosure.

FIG. 1 is a schematic structural diagram of an automatic leveling carbon fiber reinforced polymer (CFRP) plate prestressing and tensioning device for a curved surface structure according to some embodiments of the present disclosure. FIG. 2 is a schematic diagram of a front structure of an automatic leveling carbon fiber reinforced polymer (CFRP) plate prestressing and tensioning device for a curved-surface structure according to some embodiments of the present disclosure. FIG. 3 is a schematic diagram of a top view structure of an automatic leveling carbon fiber reinforced polymer (CFRP) plate prestressing and tensioning device for a curved surface structure according to some embodiments of the present disclosure.

As shown in FIGS. 1-3, the automatic leveling CFRP plate prestressing and tensioning device for curved surface structure comprises a fixed end mechanism and a tension end mechanism, and one end of the CFRP plate 4 is connected to the fixed end mechanism and the other end the CFRP plate 4 is connected to the tension end mechanism, and the fixed end mechanism is cooperated with the tension end mechanism to reinforce the automatic leveling CFRP plate of the curved surface structure.

The fixed end mechanism is a structure used to keep the CFRP plate 4 stable.

The tension end mechanism is a structure that adjusts the tensile force when tensioning the CFRP plate 4.

In some embodiments, the fixed end mechanism may include a fixed end base plate 1, a fixture 2, a fixed end CFRP plate clamping plate 3, and a second high-strength bolt 14.

The fixed end base plate 1 is a bottom support plate in the fixed end mechanism. The fixture 2 is a structure for clamping and fixing the CFRP plate.

Figure 4:
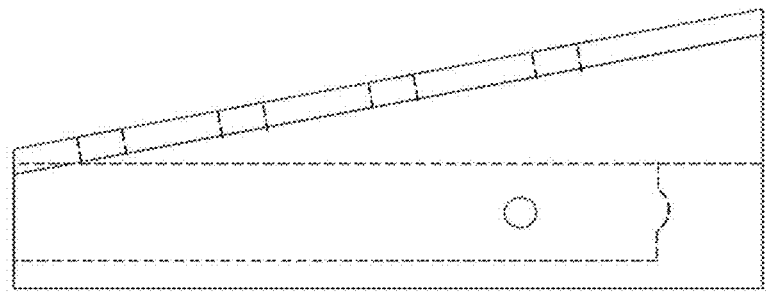
FIG. 4 is a schematic diagram of a front structure of a fixed end base plate according to some embodiments of the present disclosure.
Figure 5:
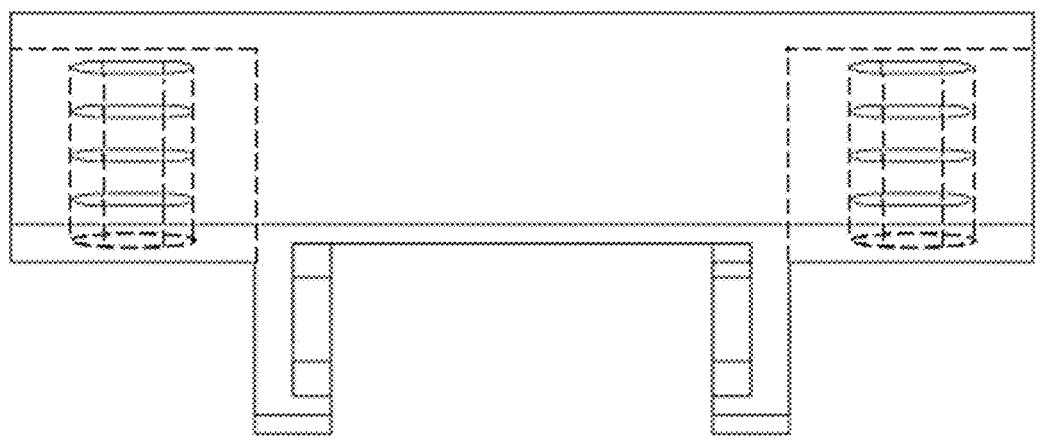
FIG. 5 is a schematic diagram of a side structure of a fixed end base plate according to some embodiments of the present disclosure.
Figure 6:
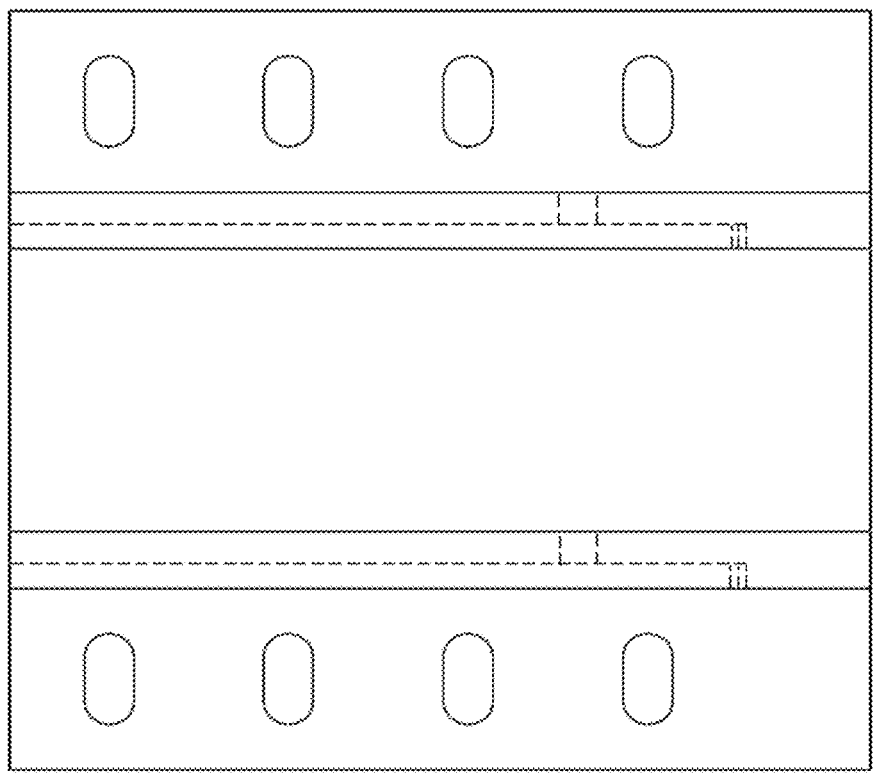
FIG. 6 is a schematic diagram of a top view structure of a fixed end base plate according to some embodiments of the present disclosure.

FIG. 4 is a schematic diagram of a front structure of a fixed end base plate according to some embodiments of the present disclosure. FIG. 5 is a schematic diagram of a side structure of a fixed end base plate according to some embodiments of the present disclosure. FIG. 6 is a schematic diagram of a top view structure of a fixed end base plate according to some embodiments of the present disclosure.

In some embodiments, the fixed end base plate 1 may be provided with a slide groove, hinged holes may be provided throughout the fixed end base plate 1 on both sides of the slide groove, and a plurality of bolt holes may be provided on both sides of the fixed end base plate 1. The slide groove may be hinged with a fixture 2 through the second high-strength bolt 14, the fixture 2 may be provided with a fixture groove, and the fixture groove may be connected to one end of the CFRP plate 4 through the fixed end CFRP plate clamping plate 3.

Figure 7:
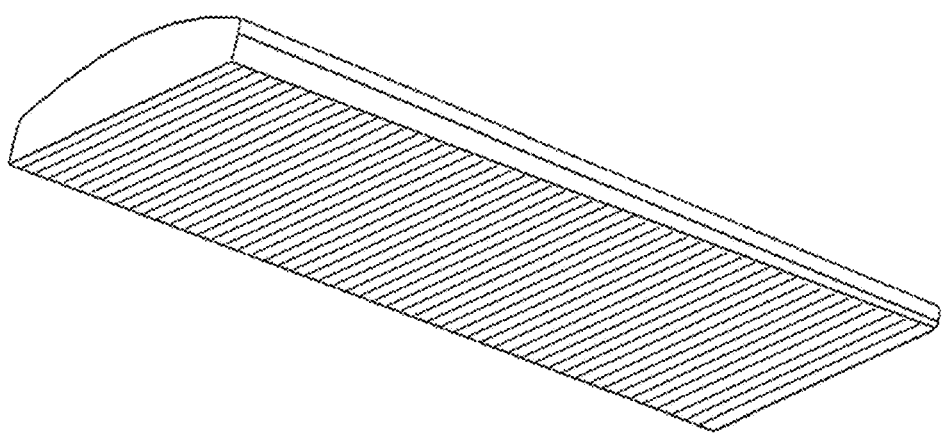
FIG. 7 is a schematic structural diagram of a CFRP plate clamping plate according to some embodiments of the present disclosure.
Figure 8:
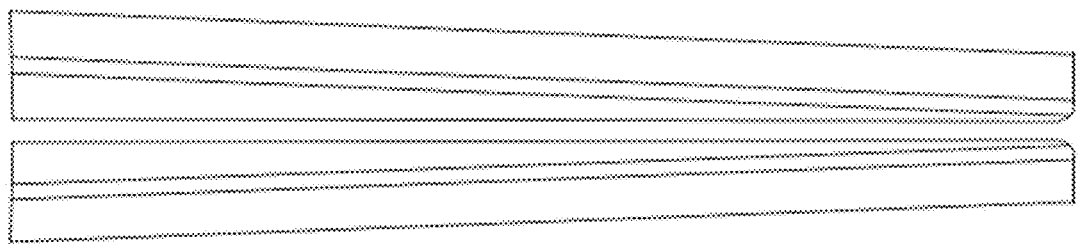
FIG. 8 is a schematic diagram of a front structure of a CFRP plate clamping plate according to some embodiments of the present disclosure.
Figure 9:
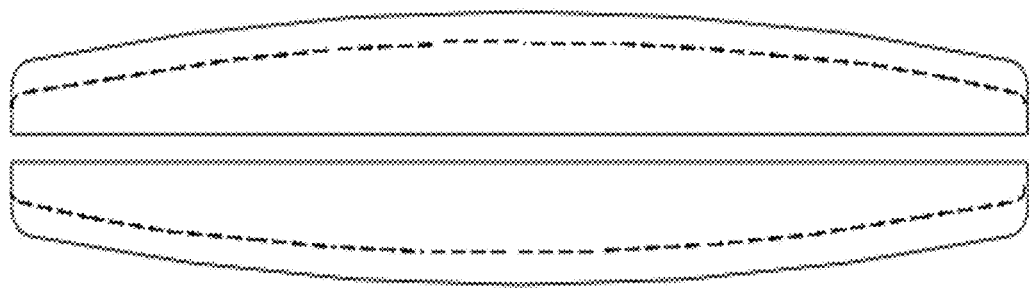
FIG. 9 is a schematic diagram of a side structure of a CFRP plate clamping plate according to some embodiments of the present disclosure.
Figure 10:
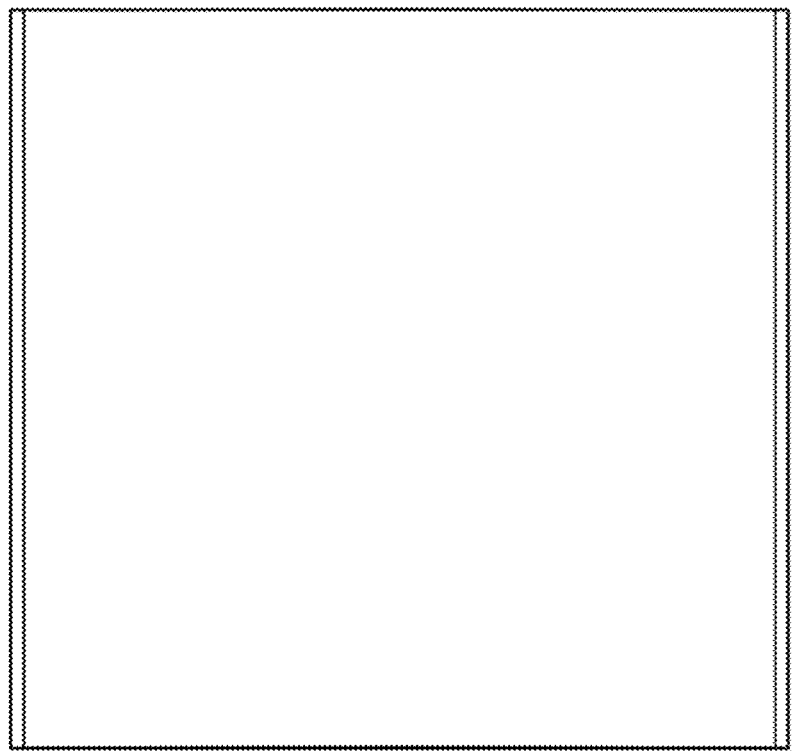
FIG. 10 is a schematic diagram of a top view structure of a CFRP plate clamping plate according to some embodiments of the present disclosure.

FIG. 7 is a schematic structural diagram of a CFRP plate clamping plate according to some embodiments of the present disclosure. FIG. 8 is a schematic diagram of a front structure of a CFRP plate clamping plate according to some embodiments of the present disclosure. FIG. 9 is a schematic diagram of a side structure of a CFRP plate clamping plate according to some embodiments of the present disclosure. FIG. 10 is a schematic diagram of a top view structure of a CFRP plate clamping plate according to some embodiments of the present disclosure.

The fixed end CFRP plate clamping plate 3 is used to fix the CFRP plate 4. In some embodiments, there are lines on the contact surface between the fixed end CFRP plate clamping plate 3 and the CFRP plate 4 to increase a friction force between the fixed end CFRP plate clamping plate 3 and the CFRP plate 4.

The lines refer to a specific pattern or bumpy structure on the aforementioned contact surface. For example, the lines may be a mark of machining, such as milling, thwarting, grinding, etc., and the grain may also be a purposely designed pattern, such as a grid, dots, stripes, etc.

In some embodiments, the friction force between the fixed end CFRP plate clamping plate 3 and the CFRP plate 4 may also be increased by other means, including but not limited to using a material with a high coefficient of friction, using a friction agent, etc., which may be determined according to the actual needs.

Figure 11:
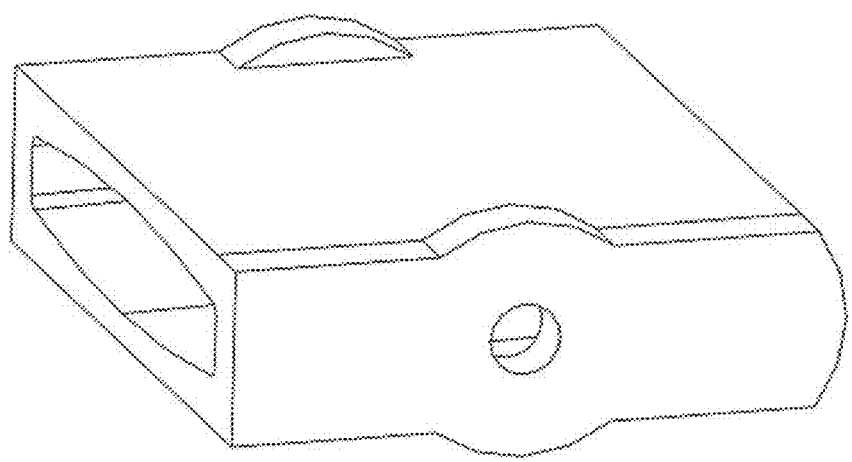
FIG. 11 is a schematic structural diagram of a fixture according to some embodiments of the present disclosure.
Figure 12:
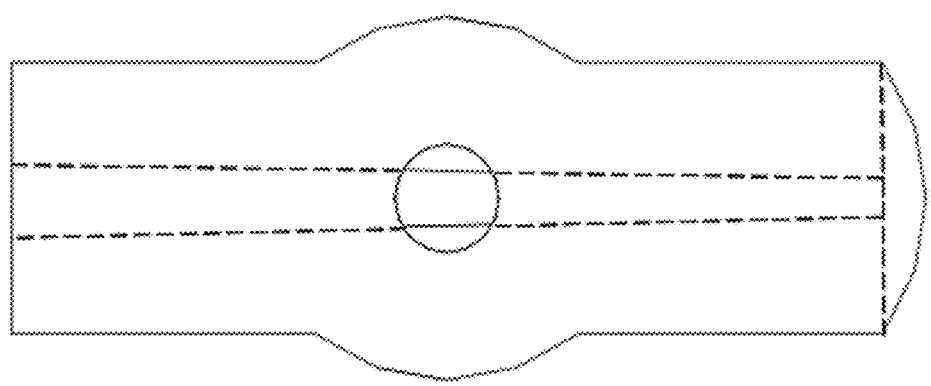
FIG. 12 is a schematic diagram of a front structure of a fixture according to some embodiments of the present disclosure.
Figure 13:
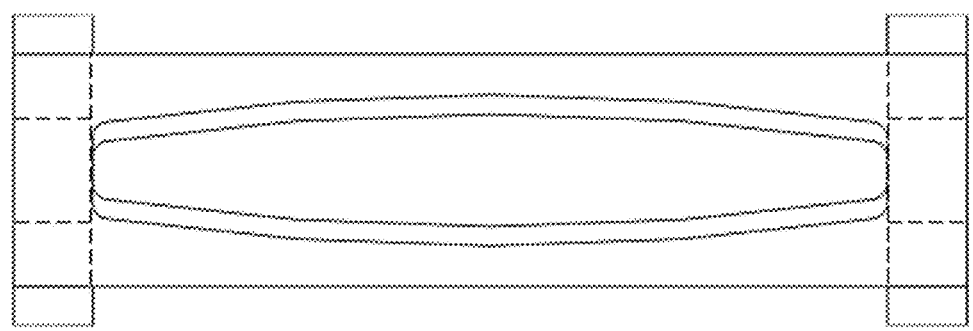
FIG. 13 is a schematic diagram of a side structure of a fixture according to some embodiments of the present disclosure.
Figure 14:
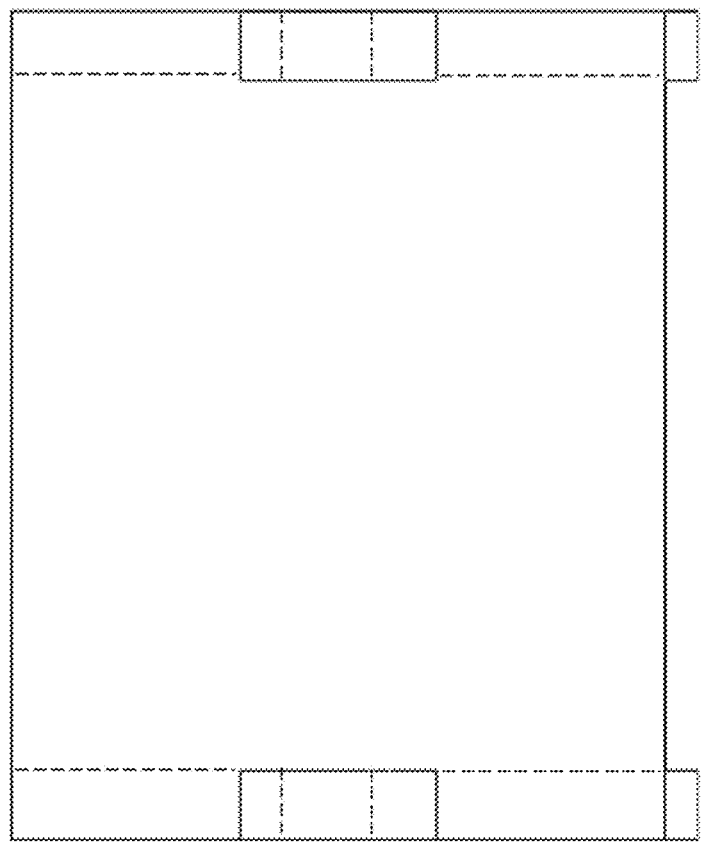
FIG. 14 is a schematic diagram of a top view structure of a fixture according to some embodiments of the present disclosure.

FIG. 11 is a schematic structural diagram of a fixture according to some embodiments of the present disclosure. FIG. 12 is a schematic diagram of a front structure of a fixture according to some embodiments of the present disclosure. FIG. 13 is a schematic diagram of a side structure of a fixture according to some embodiments of the present disclosure. FIG. 14 is a schematic diagram of a top view structure of a fixture according to some embodiments of the present disclosure.

In some embodiments, the fixture 2 may be capable of rotating in the slide groove within the fixed end base plate 1, and the rotatable fixture 2 may be used to automatically level the CFRP plate by a hinged structure during tensioning, which avoids the eccentricity of the CFRP plate caused by installation errors of device. A plurality of bolt holes may be provided on both sides of the fixed end base plate 1 for fixing the fixed end base plate 1; the second high-strength bolt 14 may be M12 high-tensile bolt; the slide groove may be used to ensure that the fixture 2 is rotated; the fixed end CFRP plate clamping plate 3 is a wedge-shaped clamp.

In some embodiments, the second high-strength bolt 14 may also be other bolts that meet the strength requirements, and the fixed end CFRP plate clamping plate 3 may be in other forms.

In some embodiments, the size of the fixture groove may decrease from one end of the fixture 2 near the tension end mechanism to the other end of the fixture 2, which can well fit with the fixed end CFRP plate clamping plate 3 to clamp the CFRP plate.

Figure 15:
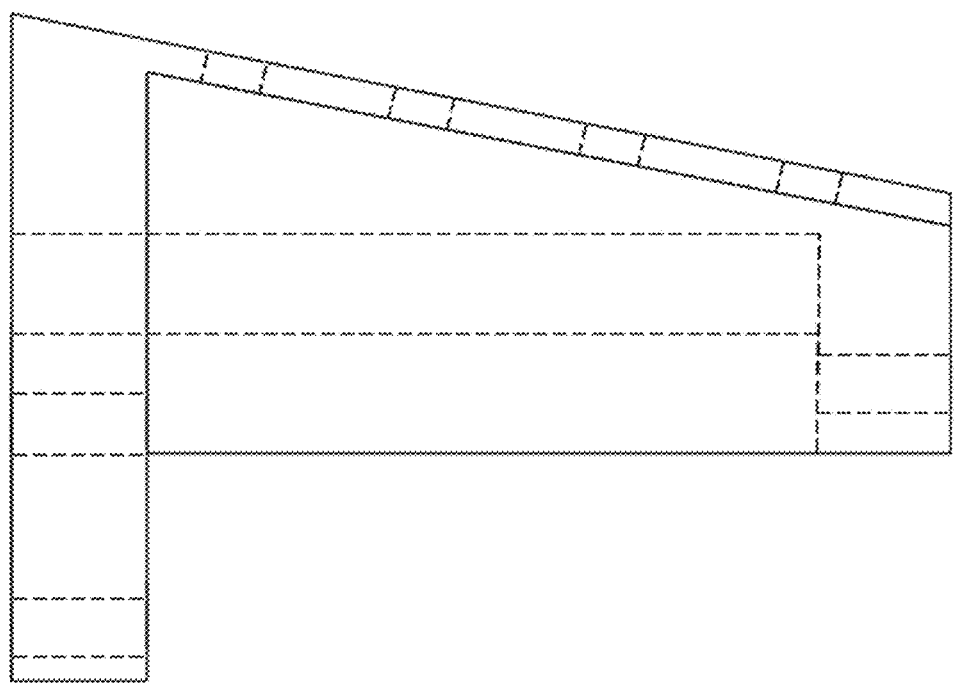
FIG. 15 is a schematic diagram of a front structure of a tension end base plate according to some embodiments of the present disclosure.
Figure 16:
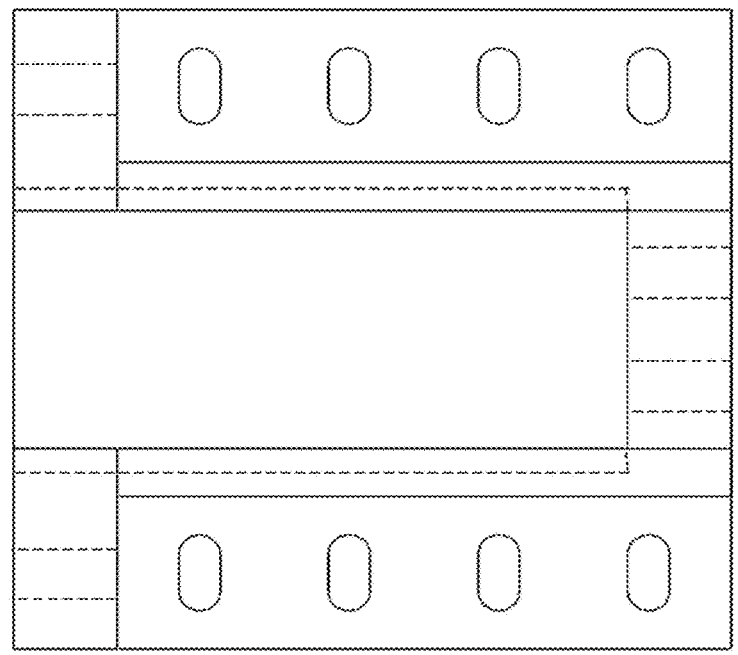
FIG. 16 is a schematic diagram of a top view structure of a tension end base plate according to some embodiments of the present disclosure.
Figure 17:
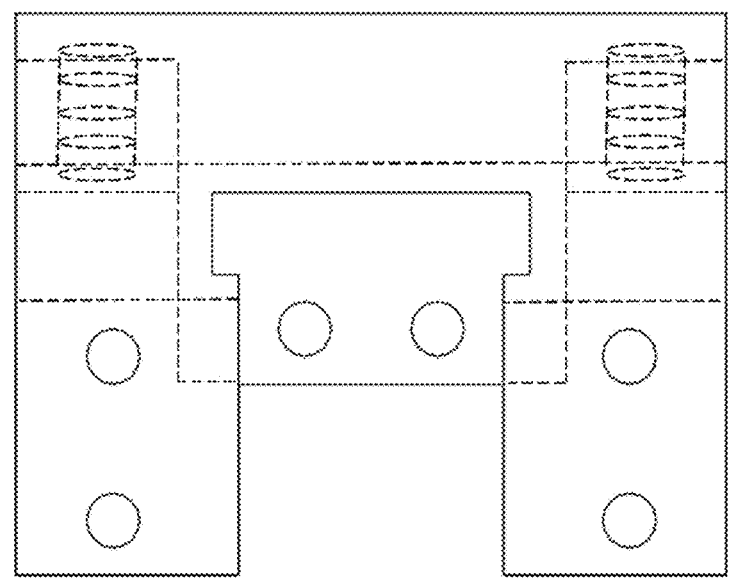
FIG. 17 is a schematic diagram of a side structure of a tension end base plate according to some embodiments of the present disclosure.

FIG. 15 is a schematic diagram of the front structure of a tension end base plate shown according to some embodiments of the present disclosure. FIG. 16 is a schematic diagram of a top view structure of a tension end base plate according to some embodiments of the present disclosure. FIG. 17 is a schematic diagram of a side view structure of a tension end base plate according to some embodiments of the present disclosure.

In some embodiments, the tension end mechanism may include a pushing and pulling mechanism, a tension end base plate 11, and a high-strength screw 10. The tension groove may be provided on the tension end base plate 11, a tension hole may be provided at an end of the tension end base plate 11 near the tension groove, a high-strength screw 10 may be provided in the tension hole, and the tension hole may be connected to the pushing and pulling mechanism through the high-strength screw 10, and a plurality of tension screws may be provided on both sides of the tension end base plate 11; the tension screws may be used to fix the tension end base plate 11; the high-strength screw 10 may be a M20 high-strength screw, and the pushing and pulling mechanism may be connected to the tension end base plate 11, and the pushing and pulling mechanism may be used to drive the CFRP plate to be tensile.

The pushing and pulling mechanism is a system of multiple mechanical components that work in concert to achieve stretching of the CFRP plate.

In some embodiments, the high-strength screw 10 may also be other screws that meet strength requirements.

Figure 18:
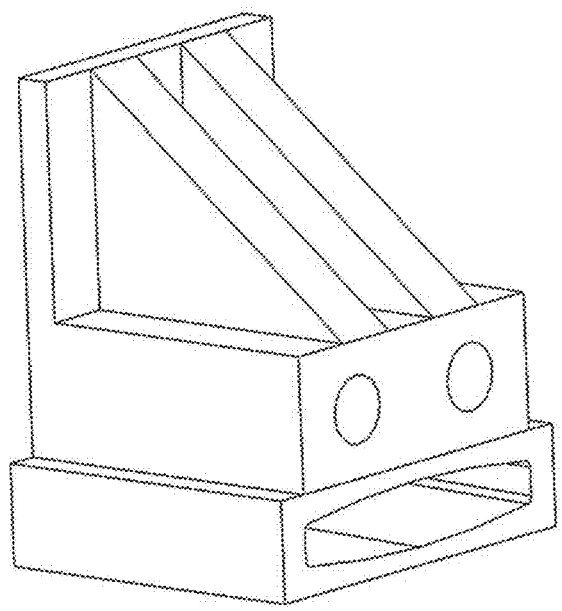
FIG. 18 is a schematic structural diagram of a pushing and pulling apparatus according to some embodiments of the present disclosure.
Figure 19:
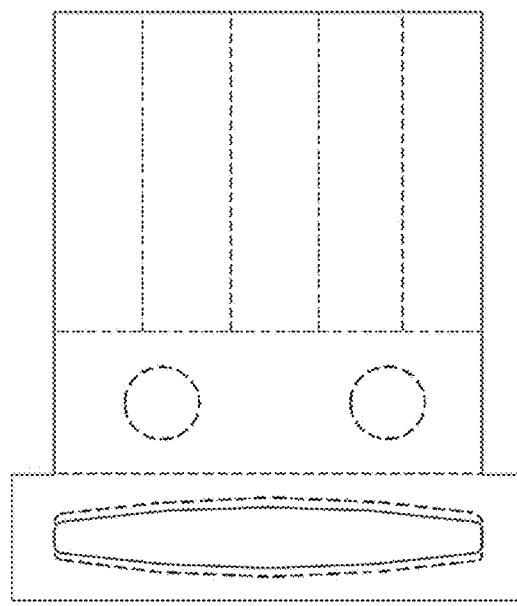
FIG. 19 is a schematic diagram of a front structure of a pushing and pulling apparatus according to some embodiments of the present disclosure.
Figure 20:
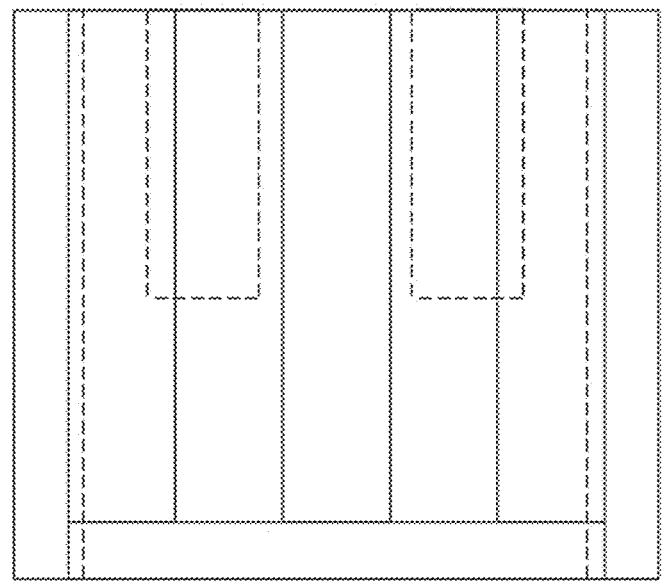
FIG. 20 is a schematic diagram of a top view structure of a pushing and pulling apparatus according to some embodiments of the present disclosure.
Figure 21:
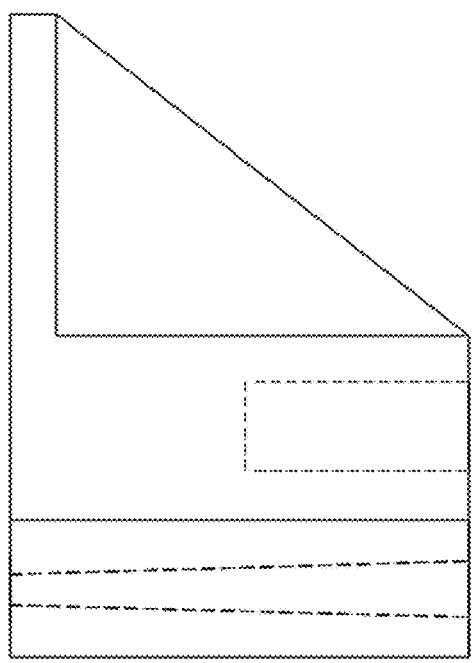
FIG. 21 is a schematic diagram of a side structure of a pushing and pulling apparatus according to some embodiments of the present disclosure.

FIG. 18 is a schematic structural diagram of a pushing and pulling apparatus according to some embodiments of the present disclosure. FIG. 19 is a schematic diagram of a front structure of a pushing and pulling apparatus according to some embodiments of the present disclosure. FIG. 20 is a schematic diagram of a top view structure of a pushing and pulling apparatus according to some embodiments of the present disclosure. FIG. 21 is a schematic diagram of a side view structure of a pushing and pulling apparatus according to some embodiments of the present disclosure.

In some embodiments, the pushing and pulling mechanism may include a pushing and pulling apparatus 12, a jack backing plate 6, an axial pressure sensor 5, a jack 7, a first high-strength bolt 13, a high-strength nut 8, and a tension end CFRP plate clamping plate 9.

In some embodiments, the pushing and pulling apparatus 12 may be provided with a connecting hole, the connecting hole may be connected to the end of the high-strength screw 10 away from the tension end base plate 11, and the pushing and pulling apparatus 12 may be provided with a push-pull through hole.

The pushing and pulling apparatus 12 is a component for generating a push or pull force.

The pushing and pulling apparatus 12 may be used to drive the CFRP plate to stretch, and the pushing and pulling apparatus may move along the high-strength screw 10; the high-strength screw 10 may guide the pushing and pulling apparatus 12; the jack backing plate 6 may be cooperated with the jack 7 to make the jack 7 stretch and retract. The jack 7 may be used to drive the pushing and pulling apparatus 12 to push and pull. The axial pressure sensor 5 may be used to indicate the load generated by the jack 7, so as to make the pushing and pulling apparatus 12 more accurate in operation. The first high-strength bolt 13 is M20 high-strength bolt; the high-strength nut 8 is M20 high-strength nut; and the tension end CFRP plate clamping plate 9 is used to fix the CFRP plate.

In some embodiments, the first high-strength bolt 13 and the high-strength nut 8 may also be other components that meet strength requirements.

In some embodiments, the push-pull through hole may be connected to an end of the CFRP plate 4 away from the fixed end mechanism through the tension end CFRP plate clamping plate 9, and an end of the pushing and pulling apparatus 12 away from the tension end base plate 11 may be connected to an end of the jack 7, an end of the jack 7 away from the pushing and pulling apparatus 12 may be connected to an end of the axial pressure sensor 5, the end of the axial pressure sensor 5 away from the jack 7 may be arranged on one side of the jack backing plate 6, the jack backing plate 6 may be provided with a plurality of plate screw holes, and a first high-strength bolt 13 may be provided within the plate screw holes, and the end of the first high-strength bolt 13 away from the jack backing plate 6 may pass through the tension screw holes along a vertical direction in the tension end base plate 11 to connect to the high-strength nut 8.

In some embodiments, the size of the push-pull through hole may decrease gradually from one end near the tension end base plate 11 to the other end, which can well fit with the fixed end CFRP plate clamping plate 3 to clamp the CFRP plate.

In some embodiments, an automatic leveling CFRP plate prestressing and tensioning device for curved surface structures may realize tensioning and fixing of the CFRP plate in the following manner: bolt holes are positioned in the reinforcement area, and the bolt holes are filled with reinforcing adhesive and then the fixed end base plate 1 and the tension-end base plate 11 are fixed to the reinforcement area using M16 high-strength bolts, and the gap between the tension end mechanism and the structure to be reinforced is filled with epoxy resin; the fixed end CFRP plate clamping plate 3 is used to clamp one end of the CFRP plate 4 and then it is placed in the fixture 2, then the fixture 2 is hinged to the fixed end base plate 1 by the second high-strength bolt 14, and the other end of CFRP plate 4 is fixed to the pushing and pulling apparatus 12 through by the tension end CFRP plate clamping plate 9, the axial pressure sensor 5 is placed at one end of the jack 7 and connected to the jack backing plate 6, which is connected to the tensioning end base plate 11 by four M20 first high-strength bolts 13 and four M20 high-strength nuts 8; the jack 7 may be contacted with the pushing and pulling apparatus 12 by an initial load applied by the jack 7, and then, as the jack 7 continuously applies load, the pushing and pulling apparatus 12 pulls the CFRP plate 4 to move in the tensioning groove of the tensioning end base plate 11 until it is tensioned to the target load; after the tensioning is completed, the CFRP plate 4 is fixed to the end of the tensioning end base plate 11 through the M20 first high-strength bolts 13 and the M20 high-strength nuts 8.

Figure 22:
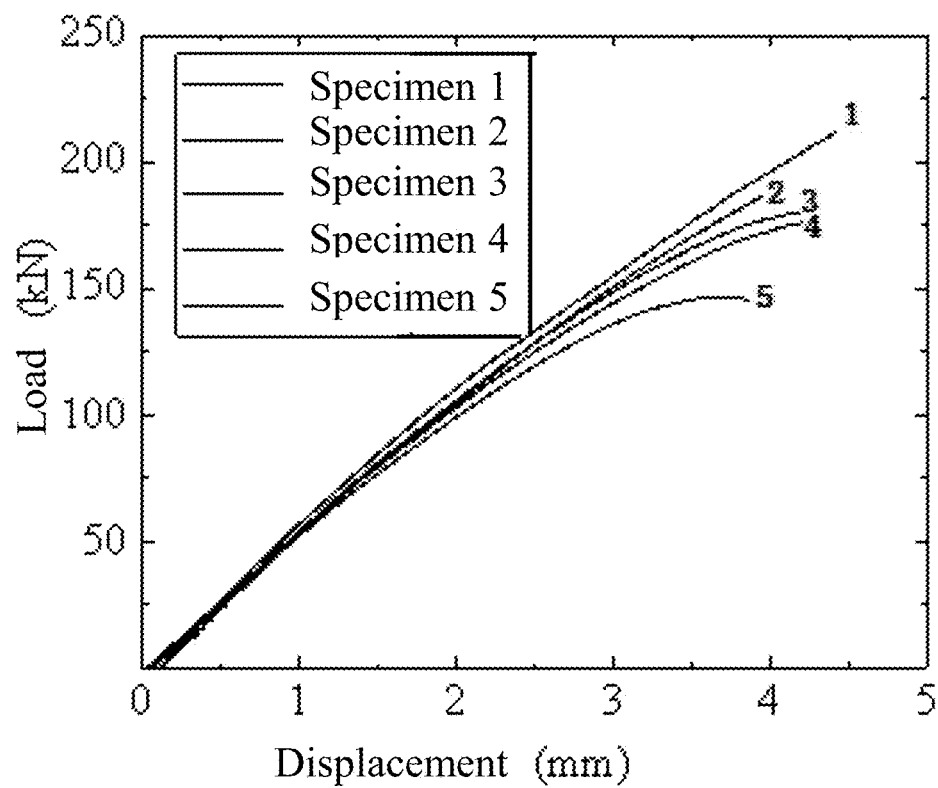
FIG. 22 is a graph of the results of a CFRP plate tensioning test according to some embodiments of the present disclosure.

FIG. 22 is a graph of the results of a CFRP plate tensioning test according to some embodiments of the present disclosure.

In some embodiments, before designing the ultimate load that the tensioning device may withstand, it is necessary to test the tensioning load that the CFRP plate may withstand to avoid the tensioning device from failing prematurely before the CFRP plate is damaged.

Only as an example, a CFRP plate with a width of 100 mm and a thickness of 2 mm may be used as a test object for the tensioning test, and the tensioning results are obtained as shown in Table 1. The results show that the average ultimate load of the CFRP plate is 180.2 kN, and the failure displacement is 4.4 mm.

TABLE 1 results of CFRP plate tensioning test

|  | Ultimate load (kN) | Displacement (mm) |
| --- | --- | --- |
| Specimen 1 | 211.5 | 4.6 |
| Specimen 2 | 186.6 | 4.2 |
| Specimen 3 | 179.7 | 4.4 |
| Specimen 4 | 176.1 | 4.4 |
| Specimen 5 | 146.9 | 4.2 |
| Average | 180.2 | 4.4 |

Exemplarily, in conjunction with the results of the CFRP plate tensioning test in FIG. 22, the CFRP plate may be considered as a linear elastic material. An equation for the displacement change of the CFRP plate may be derived from Hooke's law as shown in the following formula:

$$\Delta l = \frac{F_N l}{EA}$$

where $\Delta l$ denotes a displacement change of the CFRP plate, which has a unit of mm; $F_N$ denotes an axial force, which has a unit of N; l denotes a length of the CFRP plate, which has a unit of mm; E denotes an elasticity modulus of the CFRP plate, which has a unit of N/mm$^2$; and A denotes a cross-sectional area of the CFRP plate, which has a unit of mm$^2$.

Based on the above theoretical formulas as well as the test results, it may be concluded that the ratio of the test displacement to the theoretical displacement is close to 1.3. The comparison between test results and theoretical results is shown in Table 2, which may provide a basis and reference for designing safety tension range of the CFRP plate based on the ratio.

TABLE 2

Comparison of test displacement and theoretical displacement

| Specimen number | Test load (kN) | Test displacement (mm) | Theoretical displacement (mm) | Test displacement/ Theoretical displacement |
|---|---|---|---|---|
| Specimen 1 | 211.5 | 4.6 | 4 | 1.2 |
| Specimen 2 | 186.6 | 4.2 | 3.5 | 1.2 |
| Specimen 3 | 179.7 | 4.4 | 3.4 | 1.3 |
| Specimen 4 | 176.1 | 4.4 | 3.3 | 1.3 |
| Specimen 5 | 146.9 | 4.2 | 2.7 | 1.6 |
| Average | 180.2 | 4.4 | 3.4 | 1.3 |

The range of tensioning available for the CFRP plate in the embodiment is 138 mm, theoretically, the CFRP plate with a length of 24 m is tensioned, and in combination with the error between the test and the theory, the embodiment supports CFRP plate with a length of less than 18 m.

The most important stressing component of the pre-stressed CFRP plate tensioning device is the bolt that fixes the tensioning device, which is subjected to the joint action of tension, bending moment, and shear force.

In some embodiments, in order to ensure that the bolts do not break during tensioning of the device and when the CFRP plate breaks down, it is necessary to analyze the safety performance of the bolt set of the tensioning device according to the principles of steel construction.

Exemplarily, the bolts may include M16 high strength bolts with a grade of 10.9.

In some embodiments, the detailed process of performing a safety performance check on a tensioning device bolt set is shown below.

In some embodiments, the formula for calculating the maximum tensile force of the friction-type jointed high-strength bolt is as follows:

$$N_{t1} = \frac{N}{n} + \frac{My_1}{\sum y_i^2}$$

where $N_{t1}$ denotes a maximum tensile force of a high-strength bolt, which has a unit of N; N denotes a tensile force borne by the high-strength bolt, which has a unit of N; n denotes a total number of connected high-strength bolts; M denotes a bending moment borne by the high-strength bolt, which has a unit of N-mm; $y_1$ denotes a farthest distance from the high-strength bolt to a form axis, which has a unit of mm; $y_i$ denotes a distance from the i-th high-strength bolt to the form axis, which has a unit of mm.

In some embodiments, the maximum tensile force of the high-strength bolt is subject to the following requirements:

$$N_{t1} \leq 0.8P$$

Where P denotes a design value of the pre-tension force of a high-strength bolt, which has a unit of N.

In some embodiments, the design value of the preset tensile force of the high-strength bolts is calculated by the following formula:

$$P = \frac{0.9 \times 09 \times 0.9}{1.2} A_e f_u$$

Where $A_e$ denotes an effective cross-sectional area at the thread of the high-strength bolt, which has a unit of mm$^2$; $f_u$ denotes a minimum tensile strength of the high-strength bolt after heat treatment. Exemplarily, when the high-strength bolts with a grade of 10.9 are used, $f_u$ is taken as 1040 N/mm$^2$.

In some embodiments, the design value of the shear bearing capacity of the high-strength bolt group is calculated as follows:

$$\sum N_{v,t}^b = 0.9 n_f \mu (nP - 1.25 \sum N_{ti})$$

Where $\sum N_{v,t}^b$ denotes the design value of shear bearing capacity of the high-strength bolt group, which has a unit of N; $\mu$ denotes the slip resistance coefficient of the friction surface; and $\sum N_{ti}$ denotes a sum of the external tensile forces borne by the high-strength bolts, which has a unit of N.

In some embodiments, the shear force borne by the high-strength bolt group is subjected to the following requirements:

$$\sum N_{v,t}^b \geq V$$

Where V represents the shear force borne by the high-strength bolt group, which has a unit of N.

In some embodiments, the stresses on the pressurized connecting high-strength bolts are subject to the following requirements:

$$\sqrt{\left(\frac{N_v}{N_v^b}\right)^2 + \left(\frac{N_t}{N_t^b}\right)^2} \leq 1$$

Where $N_v$ denotes the shear force borne by the high-strength bolt, which has a unit of N; $N_v$ denotes the design value of shear bearing capacity of a high-strength bolt, which has a unit of N; $N_t$ denotes the tensile force borne by the bolt, which has a unit of N; and $N_t^b$ denotes the design value of tensile bearing capacity of a high-strength bolt, which has a unit of N.

In some embodiments, the design value of the shear bearing capacity of the high-strength bolts is calculated as follows:

$$N_v^b = n_v A_e f_v^b n$$

Where $n_v$ denotes the number of shear surfaces, taking 1 when single shear, and taking 2 when double shear; $f_v^b$ denotes the design value of shear bearing strength of bolts. Exemplarily, when high-strength bolts with a grade of 10.9 are used, $f_v^b$ is taken as 310 N/mm².

In some embodiments, the design value of the tensile bearing capacity of the high-strength bolts is calculated as follows:

$$N_t^b = nA_e f_t^b$$

Where $f_t^b$ denotes the design value of tensile bearing strength of high-strength bolts. Exemplarily, when high-strength bolts with a grade of 10.9 are used, $f_t^b$ is taken to be 500 N/mm².

In some embodiments, a shear force borne by a high-strength bolt is subject to the following requirements:

$$N_v \leq \frac{N_c^b}{1.2}$$

Where $N_c^b$ denotes the design value of the compressive load-resisting capacity of a high-strength bolt connection, which has a unit of N.

In some embodiments, the design value of the compressive load-bearing capacity of a high-strength bolt connection is calculated as follows:

$$N_c^b = d \sum t \cdot f_c^b$$

Where d denotes a diameter of a high-strength bolt, which has a unit of mm; Et denotes a minimum value of a total thickness of a pressurized member in one of the different directions of force; $f_c^b$ denotes the design value of the pressurized strength of a member connected by high-strength bolts, which has a unit of N/mm².

Tables 3 and 4 show the safety calculation results of the bolt groups. Table 3 shows calculation of the friction-type connection high-strength bolts, and Table 4 shows calculation of the pressure-type connection high-strength bolts, which may theoretically withstand at least 30 t of load bearing capacity, which is much larger than the tensile ultimate load of the CFRP plate, and the bolt group is safe. Therefore, even if the CFRP plate fails, the device is not damaged.

TABLE 3

Safety calculation results (I) of bolt group

| Diameter of bolts d (mm) | A total number of bolts | Tensile force borne by the bolt group N (N) | Bending moment by the bolt group M (N · mm) | Maximum tensile force of a bolt $N_{tl}$ (N) | 0.8 P | design value of shear bearing capacity of the bolt group $\Sigma N_{v,t}^b$ (N) | shear force borne by the bolt group V (N) |
|---|---|---|---|---|---|---|---|
| 16.0 | 8.0 | 67451.7 | 6600000.0 | 25500.4 | 124000.0 | 529543.8 | 292318.8 |

TABLE 4 safety calculation results (II) of bolt group

| Diameter of bolts d (mm) | A total number of bolts | Design value of the compressive load-resisting capacity of a bolt connection $N_c^b$ (N) | Shear force borne by a bolt $N_v$ (N) | $N_c^b/1.2$ | Design value of shear bearing capacity of a bolt $N_v^b$ (N) | Tensile force borne by the bolt group $N_t$ (N) | Design value of tensile bearing capacity of a bolt $N_t^b$ (N) |
|---|---|---|---|---|---|---|---|
| 16.0 | 8.0 | 118000.0 | 36539.8 | 98333.3 | 77623.6 | 67451.7 | 1001594.9 |

Figure 23:
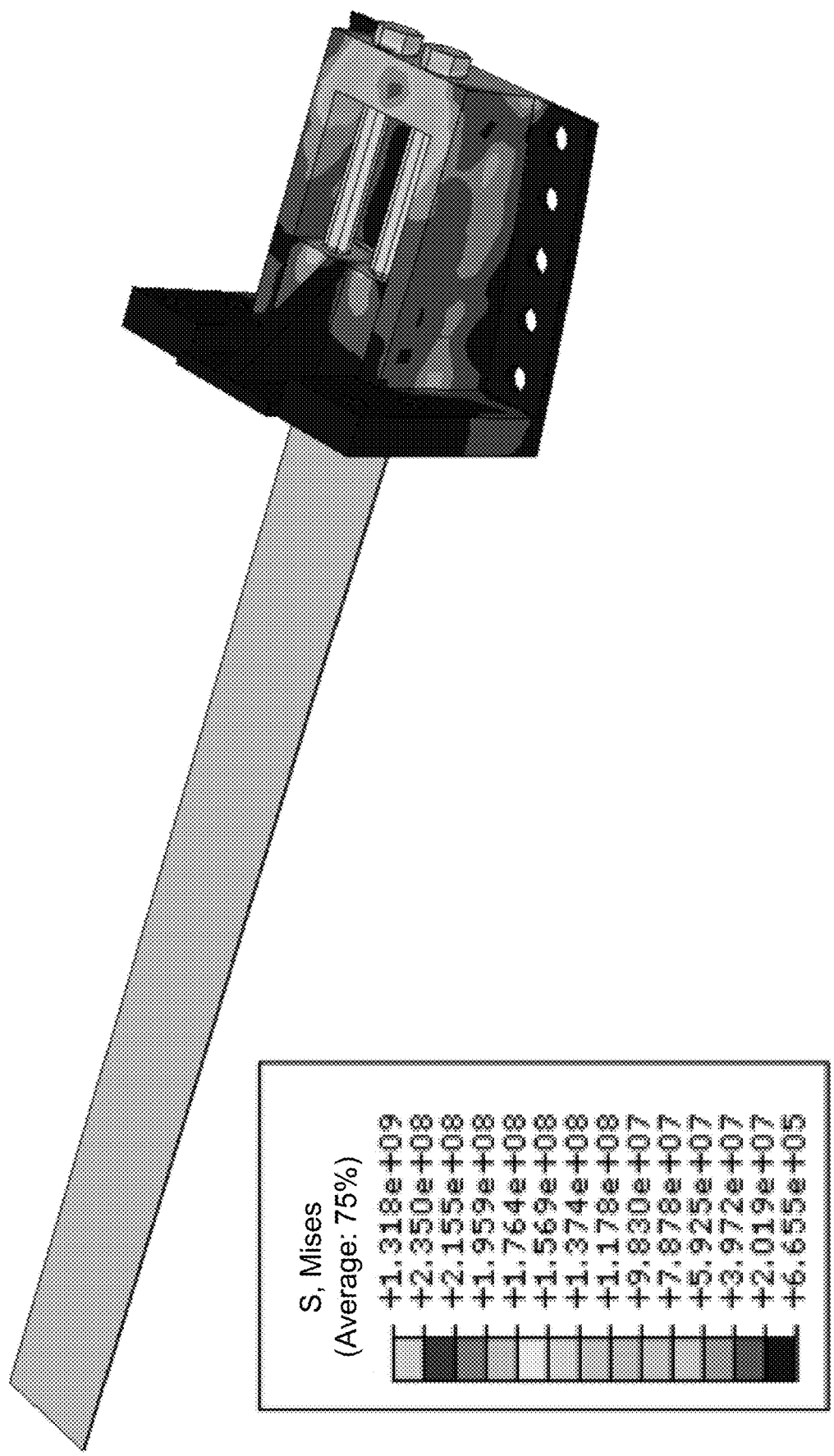
FIG. 23 is a finite element stress cloud map of a tension end mechanism without installing the jack backing plate according to some embodiments of the present disclosure.
Figure 24:
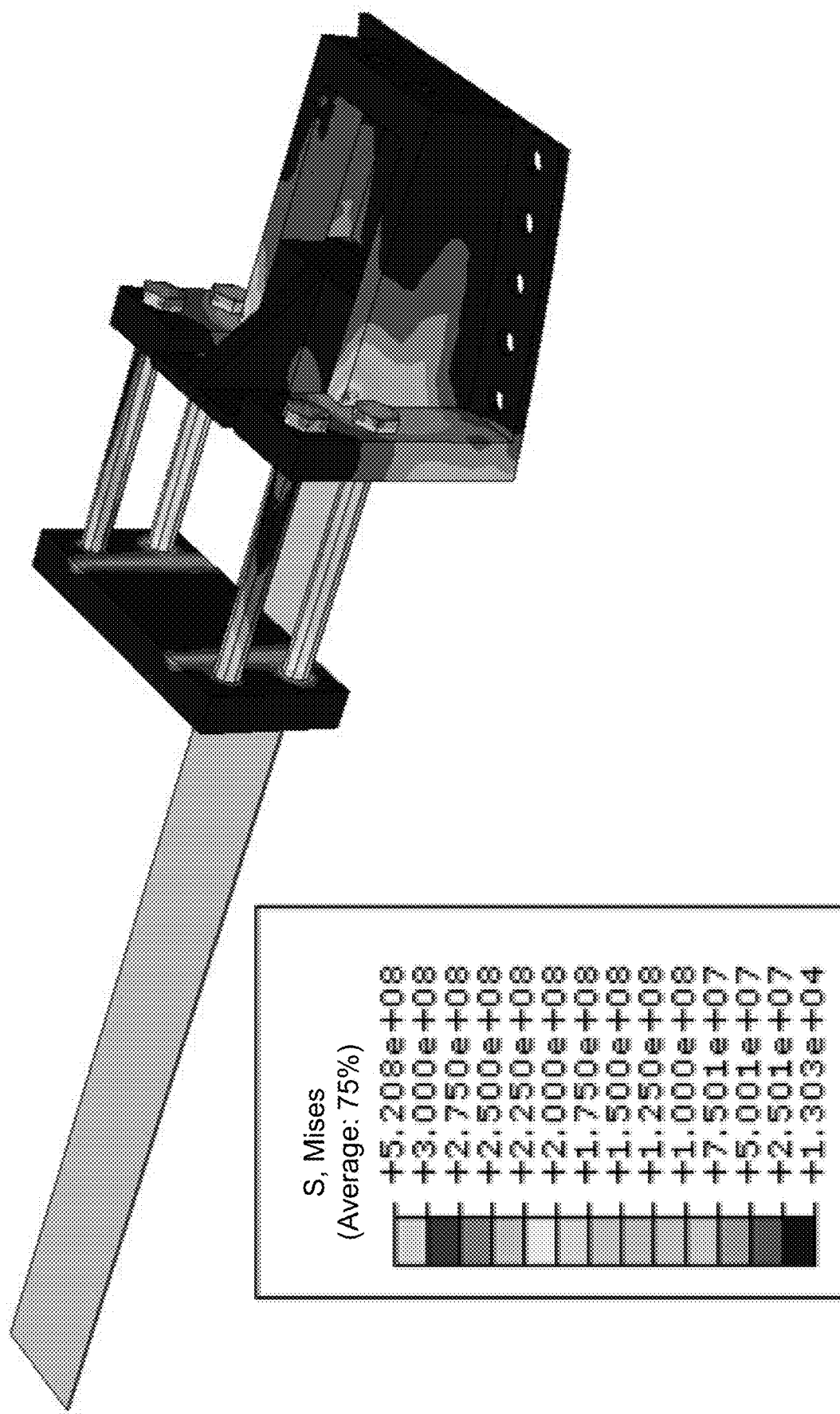
FIG. 24 is a finite element stress cloud map of a tension end mechanism with installing the jack backing plate according to some embodiments of the present disclosure.
Figure 25:
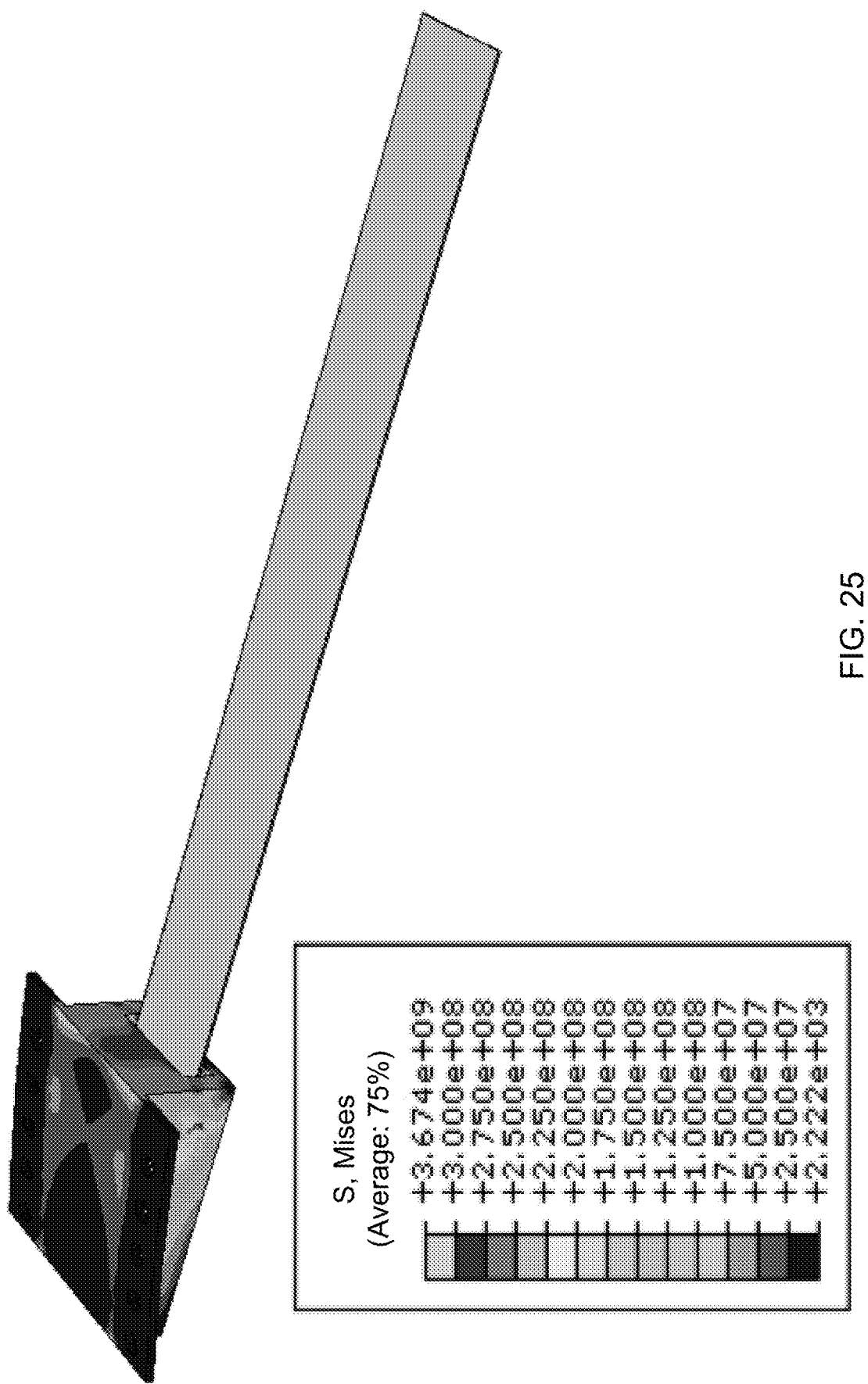
FIG. 25 is a finite element stress cloud map of a fixed end mechanism according to some embodiments of the present disclosure.

FIG. 23 is a finite element stress cloud map of the tension end mechanism without installing the jack backing plate according to some embodiments of the present disclosure. FIG. 24 is a finite element stress cloud map of the tension end mechanism with installing the jack backing plate according to some embodiments of the present disclosure. FIG. 25 is a finite element stress cloud map of a fixed end mechanism according to some embodiments of the present disclosure.

The stress cloud maps are used to view the stress distribution in the finite element analysis. It may be concluded from the stress cloud maps that the device is always in the elastic phase throughout the tensioning of the CFRP plate, and the device does not have the possibility of destroying before the destruction of the CFRP plate.

The basic concepts have been described above, and it is apparent to those skilled in the art that the foregoing detailed disclosure serves only as an example and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the specification uses specific words to describe embodiments of the specification. Such as "an embodiment", "the embodiment", and/or "some embodiments" means a feature, structure, or characteristic associated with at least one embodiment of the present disclosure. Accordingly, it should be emphasized and noted that "an embodiment" or "one embodiment" or "some embodiments" or "an alternative embodiment" referred to two or more times in different locations in the present disclosure does not necessarily refer to the same embodiment. In addition, certain features, structures, or characteristics of one or more embodiments of the present disclosure may be suitably combined.

While some embodiments of the disclosure that are presently considered useful are discussed in the foregoing disclosure by way of various examples, it is to be understood that such detail serves an illustrative purpose only, and that the additional claims are not limited to the disclosed embodiments, in contrast, the claims are intended to cover all amendments and equivalent combinations that are consistent with the substance and scope of the embodiments of the present disclosure.

Similarly, it should be noted that in order to simplify the presentation of the disclosure of the specification, and thereby aid in the understanding of one or more embodiments of the disclosure, the foregoing descriptions of embodiments of the specification sometimes combine a variety of features into a single embodiment, accompanying drawings, or descriptions thereof. However, this method of disclosure does not imply that more features are required for the objects of the present disclosure than are mentioned in the claims. Rather, claimed subject matter may lie in less than all features of a single foregoing disclosed embodiment.

For each of the patents, patent applications, patent application disclosures, and other materials cited in the present disclosure, such as articles, books, specification sheets, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. An automatic leveling carbon fiber reinforced polymer (CFRP) plate pre-stressing and tensioning device for a curved surface structure, wherein the device includes a fixed end mechanism and a tension end mechanism, one end of a CFRP plate is connected to the fixed end mechanism and the other end of the CFRP plate is connected to the tension end mechanism, and the fixed end mechanism is cooperated with the tension end mechanism to reinforce a curved surface of the curved surface structure; wherein the fixed end mechanism includes a fixed end base plate, a fixture, a fixed end CFRP plate clamping plate, and a second high-strength bolt; the fixed end base plate is provided with a slide groove, the fixed end base plate is provided with hinged holes throughout on opposing sides of the slide groove; the fixed end base plate having a plurality of bolt holes on opposing sides, the fixture is hinged within the slide groove by the second high-strength bolt; the fixture is provided with a fixture groove, and the fixture groove is connected to the one end of the CFRP plate through the fixed end CFRP plate clamping plate;

the tension end mechanism includes a pushing and pulling mechanism, a tension end base plate, and a high-strength screw, the tension end base plate is provided with a tension groove, a tension hole is provided at an end of the tension end base plate close to the tension groove, the high-strength screw is provided in the tension hole, the tension hole is connected to the pushing and pulling mechanism by the high-strength screw, and a plurality of tension screw holes are provided on opposing sides of the tension end base plate;

the pushing and pulling mechanism includes a pushing and pulling apparatus, a jack backing plate, an axial pressure sensor, a jack, a first high-strength bolt, a high-strength nut, and a tension end CFRP plate clamping plate, the pushing and pulling apparatus is provided with a connecting hole, the connecting hole is connected to one end of the high-strength screw away from the tension end base plate, and the pushing and pulling apparatus is also provided with a push-pull through hole; the push-pull through hole is connected to the other end of the CFRP plate through the tension end CFRP plate clamping plate, the other end of the CFRP plate is an end of the CFRP plate away from the fixed end mechanism, an end of the pushing and pulling apparatus away from the tension end base plate is connected to an end of the jack, an end of the jack away from the pushing and pulling apparatus is connected to an end of the axial pressure sensor, an end of the axial pressure sensor away from the jack is set on a side of the jack backing plate, the jack backing plate is provided with a plurality of plate screw holes, the first high-strength bolt is set in each of the plate screw holes, and an end of the first high-strength bolt away from the jack backing plate goes through each of the tension screw holes along a vertical direction in the tension end base plate and is connected to the high-strength nut;

a size of the fixture groove decreases from one end of the fixture near the tension end mechanism to the other end of the fixture; and a size of the push-pull through hole decreases from one end of the push-pull through hole near the tension end base plate to the other end of the push-pull through hole.

\* \* \* \* \*